US012809246B2

(12) United States Patent
Joseph et al.

(10) Patent No.: US 12,809,246 B2
(45) Date of Patent: Nov. 24, 2026

(54) SYSTEM FOR ELIMINATING PROJECTION BLOW-BY

(71) Applicant: Disney Enterprises, Inc., Burbank, CA (US)

(72) Inventors: Daniel M. Joseph, Windermere, FL (US); Jessica Klouda, Winter Garden, FL (US); Veronica Chen, Stanford, FL (US)

(73) Assignee: Disney Enterprises, Inc., Burbank, CA (US)

( * ) Notice: Subject to any disclaimer, the term of this patent is extended or adjusted under 35 U.S.C. 154(b) by 403 days.

(21) Appl. No.: 18/503,174

(22) Filed: Nov. 6, 2023

(65) Prior Publication Data

US 2025/0147402 A1 May 8, 2025

(51) Int. Cl.

*G03B 21/62* (2014.01)
*G03B 21/56* (2006.01)
*G03B 21/58* (2014.01)
*G03B 21/60* (2014.01)
*G03B 21/625* (2014.01)

(52) U.S. Cl.

CPC ............. *G03B 21/62* (2013.01); *G03B 21/56* (2013.01); *G03B 21/58* (2013.01); *G03B 21/60* (2013.01); *G03B 21/625* (2013.01)

(58) Field of Classification Search

CPC ........ G03B 21/56; G03B 21/62; G03B 21/60; G03B 21/58; G03B 21/625
USPC .......................................................... 359/443
See application file for complete search history.

(56) References Cited

U.S. PATENT DOCUMENTS 3,469,837 A * 9/1969 Heilig ..................... A63J 25/00 472/60
6,428,169 B1 * 8/2002 Deter ...................... G09F 19/18 359/449
6,481,851 B1 * 11/2002 McNelley ............. G03B 15/10 359/488.01
6,642,653 B1 * 11/2003 Hirano ..................... H01J 11/44 313/484
7,150,537 B2 * 12/2006 Peterson ................ G02B 13/06 353/69

(Continued)

FOREIGN PATENT DOCUMENTS

CN 112526815 A * 3/2021 ........... G02F 1/1334
DE 102006025638 A1 * 12/2007 ............... G09B 9/32

(Continued)

*Primary Examiner* — Stephanie E Bloss
*Assistant Examiner* — Kevin C Butler
(74) *Attorney, Agent, or Firm* — Foley & Lardner LLP

(57) ABSTRACT

A system may comprise a projection surface and a light source. The projection surface may comprise a first layer comprising a material that prevents reflection of light, a second layer comprising a transparent image forming material, and a third layer comprising a privacy screen filter. The second layer may be provided between the first layer and the third layer. The light source may be configured to emit light on the projection surface to create an image on the projection surface. The light source may face the first layer. The light may be emitted at a projection angle on the projection surface. The third layer may cause the projection surface to appear translucent from a viewpoint of the light source emitting the light at the projection angle.

20 Claims, 5 Drawing Sheets

(56) References Cited

U.S. PATENT DOCUMENTS 7,226,167 B2 * 6/2007 Cobb .................... G02B 30/26
348/42
7,342,721 B2 * 3/2008 Lukyanitsa .......... H04N 13/351
359/449
7,446,733 B1 * 11/2008 Hirimai ................ G02B 3/0062
345/32
7,499,214 B2 * 3/2009 Novet .................... G03B 21/60
359/459
7,554,730 B1 * 6/2009 Kuo ....................... G03B 21/56
359/443
8,007,110 B2 * 8/2011 Dunn ..................... G03B 21/26
353/97
8,212,744 B2 * 7/2012 Kuo ..................... G02B 17/006
345/9
8,857,994 B2 * 10/2014 Smithwick ............. G02B 30/27
353/30
9,110,364 B1 * 8/2015 Coley ...................... G02B 5/13
9,132,361 B2 * 9/2015 Smithwick .............. A63J 5/021
9,158,114 B2 * 10/2015 Kaplan ................ G02B 27/017
10,416,549 B1 * 9/2019 Dawson .................. B43L 1/002
10,691,010 B2 * 6/2020 Maes ..................... G03B 35/20
2001/0046035 A1 * 11/2001 Vanderwerf ........... G03B 21/60
348/E5.137
2005/0146787 A1 * 7/2005 Lukyanitsa .......... H04N 13/376
348/E13.05
2005/0264761 A1 * 12/2005 Cobb ................... H04N 13/346
353/7
2006/0109548 A1 * 5/2006 Goto ...................... G03B 21/10
359/449
2007/0047077 A1 * 3/2007 Browning ......... B32B 17/10761
359/453
2008/0018555 A1 * 1/2008 Kuo ..................... G02B 17/006
345/8
2009/0168027 A1 * 7/2009 Dunn ..................... G03B 21/26
353/28
2012/0188637 A1 * 7/2012 Joseph ................... G02B 30/52
359/478
2013/0300728 A1 * 11/2013 Reichow ................ G09G 3/003
345/419
2014/0118336 A1 * 5/2014 Smithwick ............ G02B 30/27
345/419
2014/0333899 A1 * 11/2014 Smithwick ............ G03B 21/00
353/10
2016/0165221 A1 * 6/2016 Duffy ................... H04N 13/363
345/87
2021/0355573 A1 * 11/2021 Zhou .................... H10K 71/166
2025/0147402 A1 * 5/2025 Joseph ................... G03B 21/62

FOREIGN PATENT DOCUMENTS

ES 2956765 T3 * 12/2023 ............. G03B 21/56
SG 195397 A1 * 12/2013 ............. G03B 21/62
TW I465827 B * 12/2014 ............. G03B 21/62
WO WO-9950702 A1 * 10/1999 ........... G02B 3/0068
WO WO-2013169206 A1 * 11/2013 ............. G03B 21/60
WO WO-2016086286 A1 * 6/2016 ........... H04N 13/395
WO WO-2017182829 A1 * 10/2017 ............. G03B 21/56

* cited by examiner

SYSTEM FOR ELIMINATING PROJECTION BLOW-BY

BACKGROUND

A projector is an optical device that projects light onto a surface. For example, the projector may create an image of the surface as a result of projecting the light onto the surface. In some instances, the projector may project the light through a system of lenses to create the image of the surface.

SUMMARY

A system may comprise a projection surface and a light source. The projection surface may comprise a first layer comprising a material that prevents reflection of light, a second layer comprising a transparent image forming material, and a third layer comprising a privacy screen filter. The second layer may be provided between the first layer and the third layer. The light source may be configured to emit light on the projection surface to create an image on the projection surface. The light source may face the first layer. The light may be emitted at a projection angle on the projection surface. The third layer may cause the projection surface to appear translucent from a viewpoint of the light source emitting the light at the projection angle.

A transparent projection surface may comprise a first layer comprising a material that prevents reflection of light; a second layer comprising a transparent image forming material; and a third layer comprising a privacy screen filter. The second layer is provided between the first layer and the third layer, and the first layer is configured to receive light emitted by a light source.

A method, for manufacturing a projection surface, may comprise providing a first layer comprising a material that prevents reflection of light; providing a second layer comprising a transparent material; and providing a third layer comprising a privacy screen filter.

DETAILED DESCRIPTION

Figure 1:
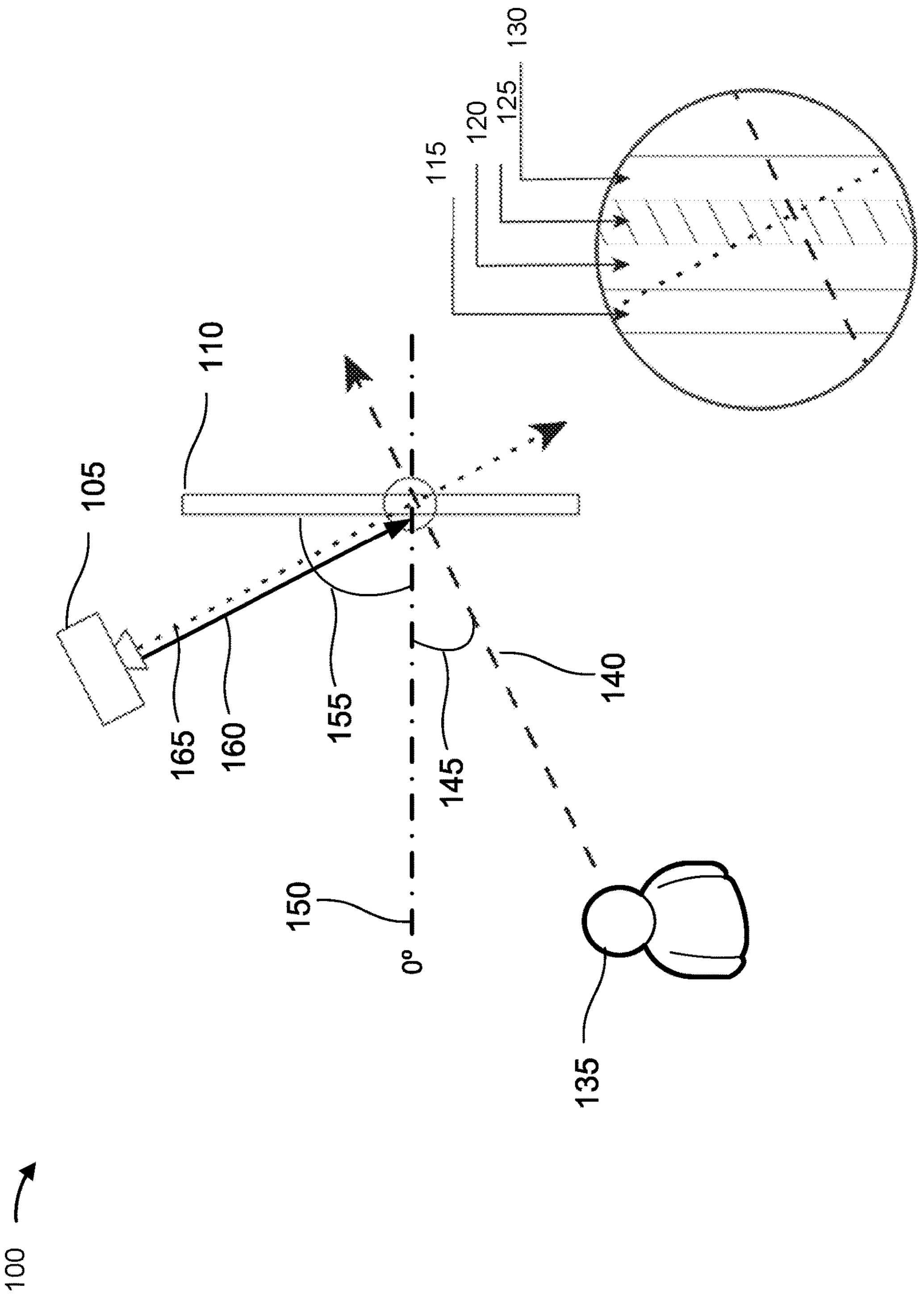
FIG. 1 is a diagram of an example system described herein.

The following detailed description of example implementations refers to the accompanying drawings. The same reference numbers in different drawings may identify the same or similar elements.

Special lighting and visual effects may be provided at a venue. The special lightning and visual effects may include holographic images, floating images, among other examples. In some situations, a video projector may be used to provide the special lighting and visual effects. For example, the video projector may project light on a clear surface, such as a transparent plastic or a scrim fabric. As used herein, scrim fabric can broadly refer to an open-weave fabric, such as muslin or hessian, that can be used to create the illusion of a solid wall, suggest haziness, or diffuse light.

A problem, with using the video projector to project the light on the clear surface, is that the light passes through the clear surface. For example, 80% of the light passes through the clear surface and is additionally projected on an additional surface (provided behind the clear surface). This problem may be referred to as "blow by" or "blow through." The additional surface may be a wall, a ceiling, an object, among other examples.

The additional projection on the additional surface negatively affects a visual quality of the projection on the clear surface. For example, the additional projection on the additional surface dims the special lighting and visual effects on the clear surface. Moreover, the additional projection on the additional surface decreases the efficiency of the special lighting and visual effects on the projection surface.

One solution to the problem mentioned above may be to reconfigure the video projector (e.g., to increase a brightness of the video projector). Another solution to the problem mentioned above may be to obfuscate the additional projection with architecture (e.g., with one or more physical structures). Yet another solution to the problem mentioned above may be to utilize one or more additional devices to illuminate the additional surface (e.g., to obfuscate the additional projection). Yet another solution to the problem mentioned above may be to build structures to obfuscate the additional projection. The additional structures may be referred to as "light traps." Yet another solution to the problem mentioned above may be to change the point of a view in which a person may view the special lighting and visual effects.

Solutions to the problem indicated above may result in negative effects. For example, reconfiguring the video projector consumes a considerable amount of computing resources. Additionally, or alternatively, obfuscating the additional projection with architecture and/or with the one or more additional devices is time-consuming. Additionally, or alternatively, obfuscating the additional projection with architecture and/or with the one or more additional devices increases the cost of creating the special lighting and visual effects. Additionally, or alternatively, obfuscating the additional projection with architecture and/or with the one or more additional devices reduces the different types of special lighting and visual effects that may be created using the projector.

Implementations described herein are directed to a system that enables light to be projected on a projection surface without causing the light to pass through the projection surface. In other words, the light may be projected on the projection surface without being projected on an additional surface located behind the projection surface.

The system may include a light source that is configured to project the light. The light source may project the light at a projection angle on the projection surface (e.g., to form an image on the projection surface). The image may be viewed by a guest at a viewing angle that is different than the projection angle.

The projection surface may include multiple layers. For example, the projection surface may include a first layer comprising a material that prevents reflection of light, a second layer comprising a transparent image forming material, and a third layer comprising a privacy screen filter. The second layer may be provided between the first layer and the third layer.

The privacy screen filter may be a film that appears transparent from a first viewpoint and appears translucent or opaque in a second direction different from the first direction. Alternatively, the privacy screen filter may appear opaque from the second viewpoint. In other words, the privacy screen filter may be a film that appears transparent in a first direction and translucent or opaque in a second direction. Accordingly, the privacy screen filter may cause the projection to appear transparent from the first viewpoint and translucent from the second viewpoint.

When viewing the projection surface at the viewing angle, the projection surface may appear transparent to the guest. In other words, the viewpoint of the guest may be the first viewpoint. Conversely, when projecting the light at the projection angle, the projection surface may appear translucent or opaque to the light source. In other words, the viewpoint of the light source may be the second viewpoint.

Because the light source is projecting the light on the projection surface that appears translucent or opaque, the light is not projected on the additional surface. In this regard, the privacy screen filter may prevent the light from being projected on the additional surface based on the light being projected at the projection angle corresponding to the second viewpoint.

By preventing the light from being projected on the additional surface, the privacy screen filter may enable the images formed on the projection surface to exceed a brightness of the images that would have been formed on the projection surface without the privacy filter. Accordingly, by preventing the light from being projected on the additional surface, the privacy screen filter may improve the efficiency of projecting the light to create the special lighting and visual effects on the projection surface.

Accordingly, the system described herein preserves the computing resources that would have otherwise been consumed to reconfigure the light source. Additionally, the system described herein preserves the amount of time and the cost associated with obfuscating the additional projection with architecture, with structures, and/or with the one or more additional devices. Moreover, the system described herein enables different types of special lighting and visual effects to be created. Furthermore, the system described herein enables the materials, of the projection surface, to be used in flexible use case installation.

FIG. 1 is a diagram of an example system 100 described herein. As shown in FIG. 1, system 100 may include a light source 105 and a projection surface 110. Light source 105 may include one or more devices configured to emit light. In some examples, light source 105 may be a projector (e.g., an image projector and/or a video projector). Light source 105 may be configured to create an image on projection surface 110 by emitting a light through a small transparent lens. Additionally, or alternatively, light source 105 may be configured to create the image on projection surface 110 may project the image using one or more lasers. Based on light source 105 being configured to create the image on projection surface 110, the image may be part of special lighting and visual effects.

Projection surface 110 may be a transparent projection surface. As shown in FIG. 1, projection surface 110 may include a plurality of layers. For example, projection surface 110 may include a first layer 115 comprising a material that prevents reflection of light, a second layer 120 comprising a transparent image forming material, and a third layer 125 comprising a privacy screen filter. Second layer 120 may be provided between first layer 115 and third layer 125.

First layer 115 may be configured to prevent a bright light from reflecting on a piece of glass or plastic. First layer 115 may be configured to prevent a hot spot during projection of the light on projection surface 110. First layer 115 may comprise an anti-reflective film. Alternatively, first layer 115 may comprise a material that prevents glare. For example, first layer 115 may comprise an anti-glare material.

Second layer 120 may be configured to cause an image to be formed based on the light projected by light source 105 on projection surface 110. As an example, second layer 120 may include a film, such as a holographic film. The film may be clear or transparent. Alternatively, second layer 120 may include a fabric, such as a scrim fabric.

Additionally, or alternatively, second layer 120 may include transparent projection surfaces and materials. For example, second layer 120 may include a fabric material, a mesh material, a holoscreen-type projection window film, and/or a spray applied transparent projection coatings material, among other examples. In some instances, an emulsion chemical may be applied on second layer 120. Additionally, or alternatively, second layer 120 may include a film for screen printing applications. For example, second layer 120 may include a polyester film (e.g., dimensionally stable polyester film) with a clear microporous coating.

Third layer 125 may be configured to prevent the light projected on projection surface 110 from being projected on an additional surface located behind projection surface 110. For example, third layer 125 may include a film that appears transparent from the first viewpoint and translucent from the second viewpoint. Alternatively, the film may appear opaque from the second viewpoint. In other words, the privacy screen filter may be a film that appears transparent in a first direction and translucent or opaque in a second direction. Accordingly, the privacy screen filter may cause the projection to appear transparent from the first viewpoint and translucent from the second viewpoint.

As shown in FIG. 1, in some situations, projection surface 110 may additionally include a fourth layer 130 comprising a clear material that is configured to provide physical support to first layer 115, second layer 120, and third layer 125. Third layer 125 may be provided between second layer 120 and fourth layer 130. In some examples, fourth layer 130 may include a plexiglass material. Alternatively, fourth layer 130 may include a glass material.

As shown in FIG. 1, a guest 135 may view the image projected on projection surface 110. The term "guest" may be used to refer to a person, a party, a patron, a passenger, among other examples. As used herein, the term "guest" may broadly be used to refer to a person, a party, a patron, and/or a passenger, among other examples. Guest 135 may view the image from guest viewpoint 140 at a viewing angle 145. Viewing angle 145 may be a steep angle with respect to a central angle of a central viewpoint 150. For example, if the central angle is 0°, viewing angle 145 may be −45°. From viewing angle 145, projection surface 110 may appear transparent.

In contrast to viewing angle 145, light source 105 may project light at a projection angle 155. For example, if the central angle is 0°, projection angle 155 may be +45°. Light source 105 may project light 160 at projection angle 155. By projecting light 160 at projection angle 155, light source 105 may view projection surface 110 from light source viewpoint 165 (e.g., the second viewpoint). Because projection surface 110 projects light 160 at projection angle 155, third layer 125 may prevent light 160 from passing through projection surface 110 to be projected on an additional surface. Light 160 may be diffused at projection angle 155. An entirety of light 160 (or a substantial amount of light 160) may be projected imaged on projection surface 110 and, accordingly, not wasted by being projected on the additional surface. In some implementations, light 160 will not pass through second layer 120 and projection surface 110 may remain clear.

Third layer 125 may be configured to enable projection surface 110 to be a front projection surface or a back projection surface. For example, third layer 125 may be configured to cause the image to be formed by way of a front projection on projection surface 110 or by way of a back projection on projection surface 110. With respect to the front projection, light source 105 and guest 135 may be located on a same side of projection surface 110. With respect to the back projection, light source 105 and guest 135 may be located on opposite sides of projection surface 110. Similarly, second layer 120 may be configured to cause the image to be formed by way of a front projection or by way of a back projection.

While FIG. 1 illustrates the plurality of layers of projection surface 110 in a particular order, the plurality of layers may be provided in a different order. For example, third layer 125 may be provided between first layer 115 and second layer 120 while second layer 120 may be provided between third layer 125 and first layer 115.

As indicated above, FIG. 1 is provided as an example. Other examples may differ from what was described in connection with FIG. 1.

Figure 2:
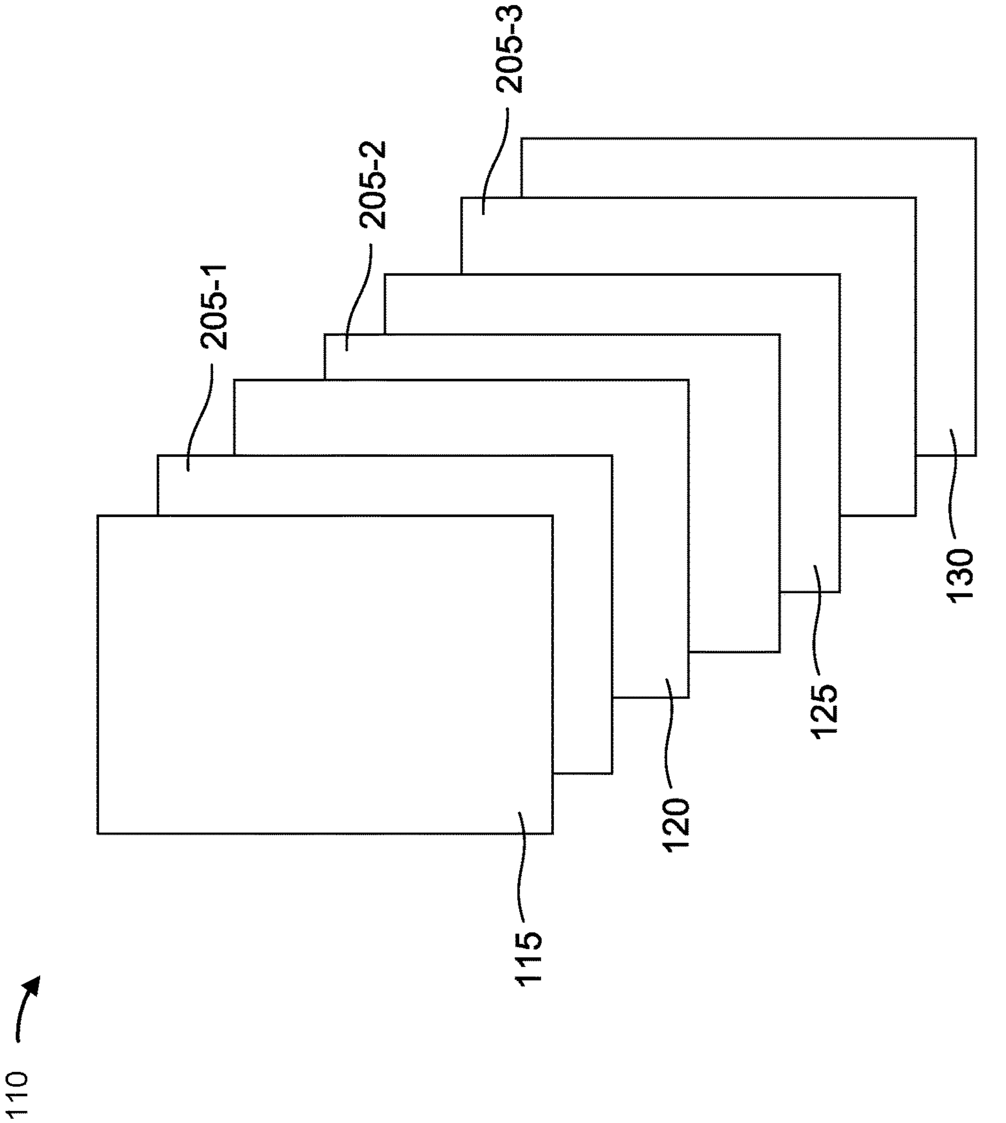
FIG. 2 is a diagram of an example projection surface described herein.

FIG. 2 is a diagram of an example projection surface 110 described herein. Elements of system 100 have been described above in connection with FIG. 1. As shown in FIG. 2, projection surface 110 may include a first adhesive material 205-1, a second adhesive material 205-2, and a third adhesive material 205-3 (collectively adhesive materials 205). Adhesive materials 205 may be configured to bond together the plurality of layers of projection surface 110.

As shown in FIG. 2, first adhesive material 205-1 may be provided between first layer 115 and second layer 120, second adhesive material 205-2 may be provided between second layer 120 and third layer 125, and third adhesive material 205-3 may be provided between second layer 120 and fourth layer 130. First adhesive material 205-1 may be configured to adhere first layer 115 and second layer 120, second adhesive material 205-2 may be configured to adhere second layer 120 and third layer 125, and so on.

As indicated above, FIG. 2 is provided as an example. Other examples may differ from what was described in connection with FIG. 2.

Figure 3:
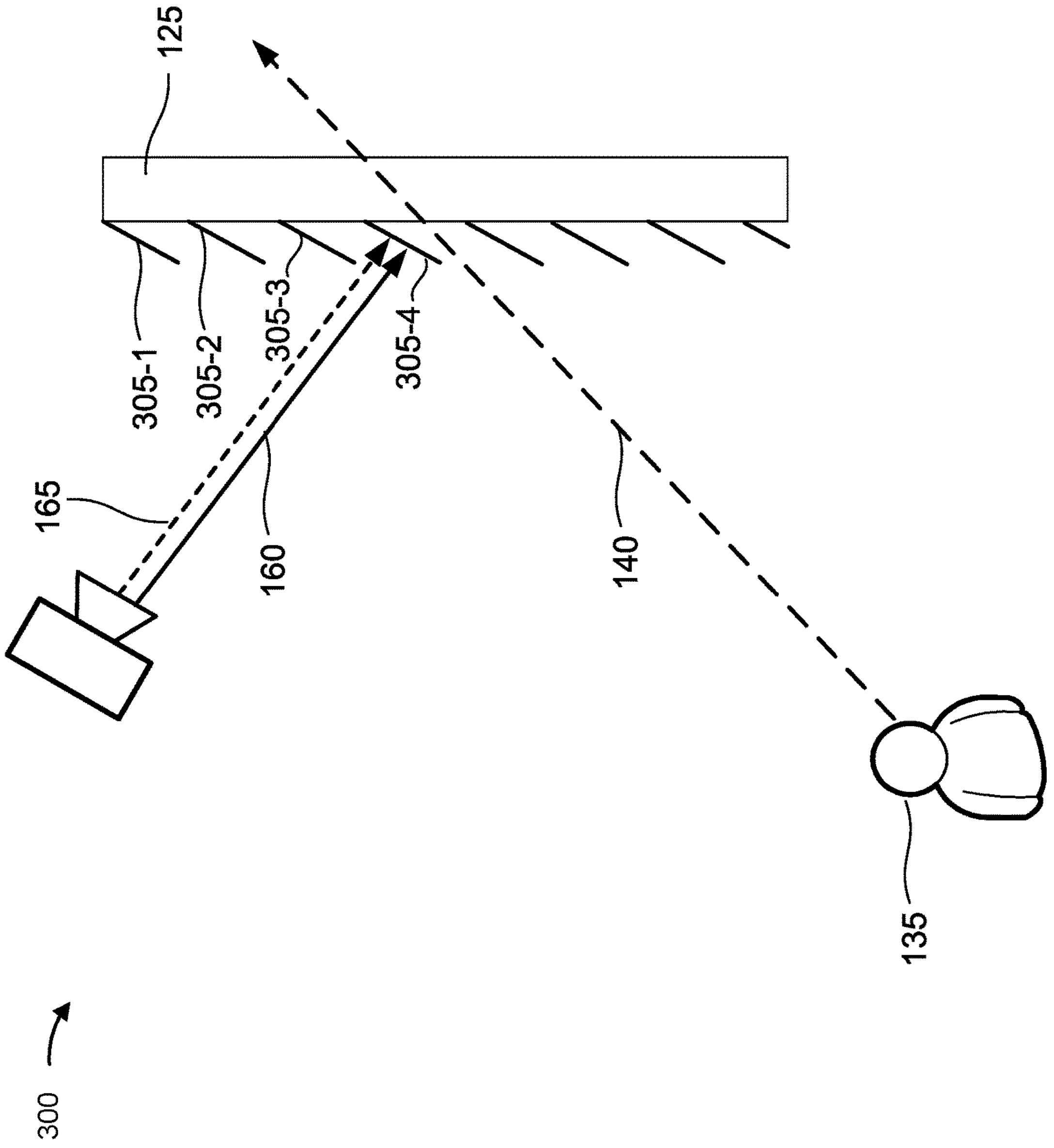
FIG. 3 is a diagram of an example implementations of an example privacy screen filter described herein.

FIG. 3 is a diagram of an example implementation 300 of an example layer described herein. The example layer may be third layer 125. As shown in FIG. 3, third layer 125 (or the privacy screen filter) may include a plurality of louvers or micro-louvers. For example, third layer 125 may include a first micro-louver 305-1, a second micro-louver 305-2, a third micro-louver 305-3, a fourth micro-louver 305-4, and so on. As used herein, louvers and micro-louvers can be used to broadly refer to elements that prevent light from passing through third layer 125 when the light is emitted at projection angle 155.

In this regard, the micro-louvers may be configured to cause third layer 125 to appear transparent at viewing angle 145 and cause third layer 125 to appear translucent or opaque at projection angle 155. For example, as shown in FIG. 3, the micro-louvers may prevent light 160 emitted at projection angle 155 from passing through third layer 125. Accordingly, the micro-louvers may prevent light 160 from being projected on an additional surface.

As indicated above, FIG. 3 is provided as an example. Other examples may differ from what was described in connection with FIG. 3.

Figure 4:
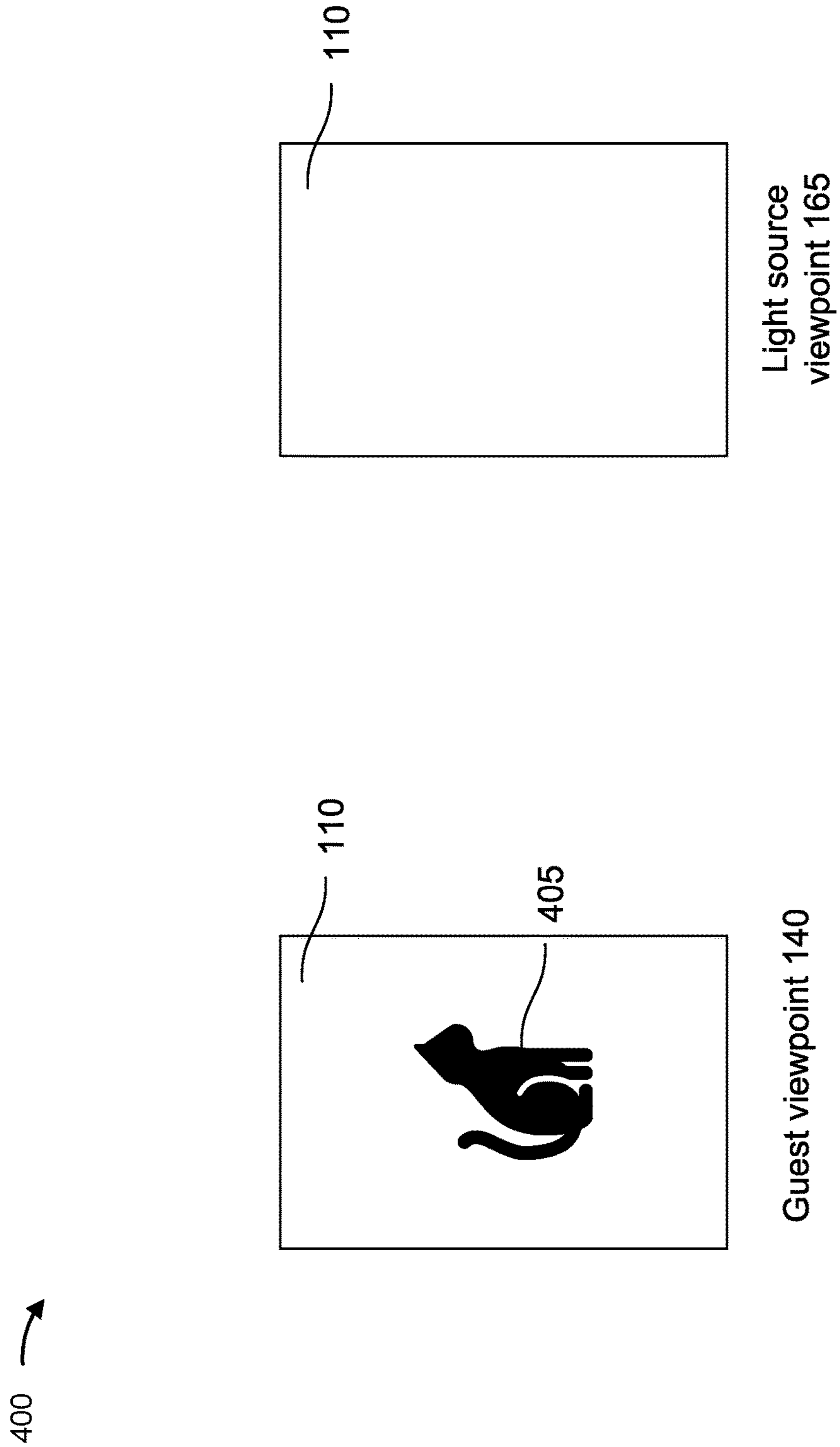
FIG. 4 is a diagram of example viewpoints described herein.

FIG. 4 is a diagram of example viewpoints described herein. As shown in FIG. 4, projection surface 110 may appear transparent from guest viewpoint 140. For example, guest 135 may be able to view an item 405 through projection surface 110. Item 405 may be located behind projection surface 110. In contrast, as shown in FIG. 4, projection surface 110 may appear translucent or opaque from light source viewpoint 165. For example, guest 135 may be unable to view (or unable to clearly view) item 405 through projection surface 110.

As indicated above, FIG. 4 is provided as an example. Other examples may differ from what was described in connection with FIG. 4.

Figure 5:
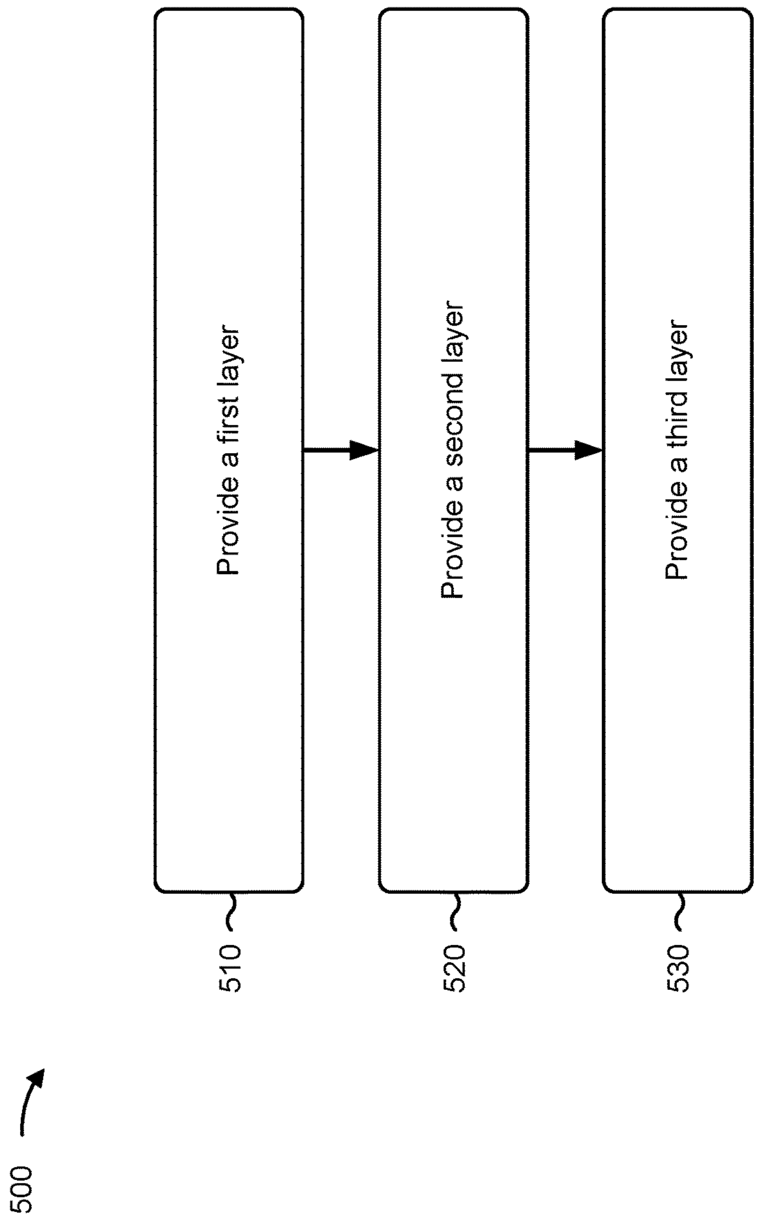
FIG. 5 is a flowchart of an example process associated with manufacturing an example projection surface described herein.

FIG. 5 is a flowchart of an example process 500 associated with manufacturing an example projection surface described herein.

As shown in FIG. 5, process 500 may include providing a first layer (block 510). In some implementations, the first layer may comprise an anti-reflective material, or an anti-glare material. In some examples, a thickness of the first layer may be approximately 0.1 mm.

As shown in FIG. 5, process 500 may include providing a second layer (block 520). In some examples, a thickness of the second layer may be approximately 0.1 mm. In some implementations, process 500 may include providing a first clear adhesive material between the first layer and the second layer.

As shown in FIG. 5, process 500 may include providing a third layer (block 530). In some implementations, the second layer may be provided between the first layer and the third layer. In some implementations, process 500 may include providing a second clear adhesive material between the second layer and the third layer. In some examples, a thickness of the third layer may be approximately 0.254 mm.

In some implementations, the third layer may be a directional film. For example, the third layer comprises a plurality of elements. The plurality of elements may cause the third layer to appear translucent when viewed from a first direction that is parallel to the projection angle. Alternatively, the plurality of elements may cause the third layer to appear transparent when viewed from a second direction that is not parallel to the projection angle.

In some implementations, process 500 may include providing a fourth layer comprising a plexiglass material. The third layer may be provided between the second layer and the fourth layer. Process 500 may include providing a third clear adhesive material between the third layer and the fourth layer.

The different layers may be of any size (height and width). A layer may be tiled and or may be modified by way of seam sheets to adjust the size of the layer (e.g., to make the layer wider or taller).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term “component” is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”). Further, spatially relative terms, such as “below,” “lower,” “above,” “upper,” and the like, may be used herein for ease of description to describe one element or feature’s relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
a projection surface comprising:
a first layer comprising a material that prevents reflection of light,
a second layer comprising an image forming material, and
a third layer comprising a privacy screen filter configured to appear transparent at a first angle and appear translucent or opaque at a projection angle;
and a light source configured to emit light at the projection angle on the projection surface to create an image on the projection surface;
wherein the third layer prevents the light emitted at the projection angle from passing through the projection surface.

2. The system of claim 1, wherein the projection surface further comprises an adhesive material between one of the first layer, the second layer, or the third layer and another of the first layer, the second layer, or the third layer.

3. The system of claim 1, wherein the projection surface further comprises a fourth layer configured to provide support to at least one of the first layer, the second layer, or the third layer.

4. The system of claim 1, wherein:
the projection surface is configured to appear transparent from a first viewpoint of a person at the first angle different than the projection angle; and
the projection surface is configured to appear translucent or opaque from a second viewpoint of the light source at the projection angle.

5. The system of claim 4, wherein the first viewpoint and the second viewpoint are on a same side of the projection surface.

6. The system of claim 4, wherein the first viewpoint and the second viewpoint are on opposite sides of the projection surface.

7. The system of claim 1, wherein the third layer prevents a portion of the light from being projected on an additional surface.

8. The system of claim 1, wherein the light source comprises an image projector.

9. The system of claim 1, wherein:
the second layer is provided between the first layer and the third layer; and
the light source is configured to emit the light towards the first layer.

10. The system of claim 1, wherein the first angle is 45° in a first direction from a central viewpoint of the projection surface and the projection angle is 45° in a second direction from the central viewpoint, the second direction opposite of the first direction.

11. A projection surface comprising:
a first layer configured to prevent reflection of light;
a second layer configured to cause an image to be formed based on a projected light; and
a third layer configured to appear transparent at a first angle and appear translucent or opaque at a projection angle different than the first angle;
wherein the second layer is provided between the first layer and the third layer; and
wherein the projection surface is configured to receive light emitted at the projection angle.

12. The projection surface of claim 11, further comprising:

a fourth layer comprising a clear material, the fourth layer configured to provide support to at least one of the first layer, the second layer, or the third layer.

13. The projection surface of claim 11, wherein the third layer comprises a plurality of louvers or micro-louvers, the plurality of louvers configured to block light from the projection angle and allow light from the first angle.

14. The projection surface of claim 11, wherein the second layer includes at least one of a film, a fabric material, a mesh material, or a projection coatings material.

15. The projection surface of claim 11, wherein the first layer and the second layer comprise a transparent material.

16. A method for manufacturing a projection surface, the method comprising:

providing a first layer comprising a material that prevents reflection of light;

providing a second layer comprising an image forming material; and providing a third layer comprising a privacy screen filter and a plurality of elements, the plurality of elements configured to cause the third layer to appear transparent at a first angle and appear translucent or opaque at a projection angle different than the first angle.

17. The method of claim 16, further comprising:

bonding, by a first clear adhesive material, the first layer and the second layer; and bonding, by a second clear adhesive material, the second layer and the third layer.

18. The method of claim 16, further comprising:

providing a fourth layer comprising a clear material;

wherein the third layer is provided between the second layer and the fourth layer.

19. The method of claim 16, wherein the material that prevents reflection of light comprises:

an anti-reflective material, or an anti-glare material.

20. The method of claim 16, wherein the plurality of elements are configured to block light from the projection angle and allow light from the first angle.

* * * * *